UNITED STATES PATENT OFFICE.

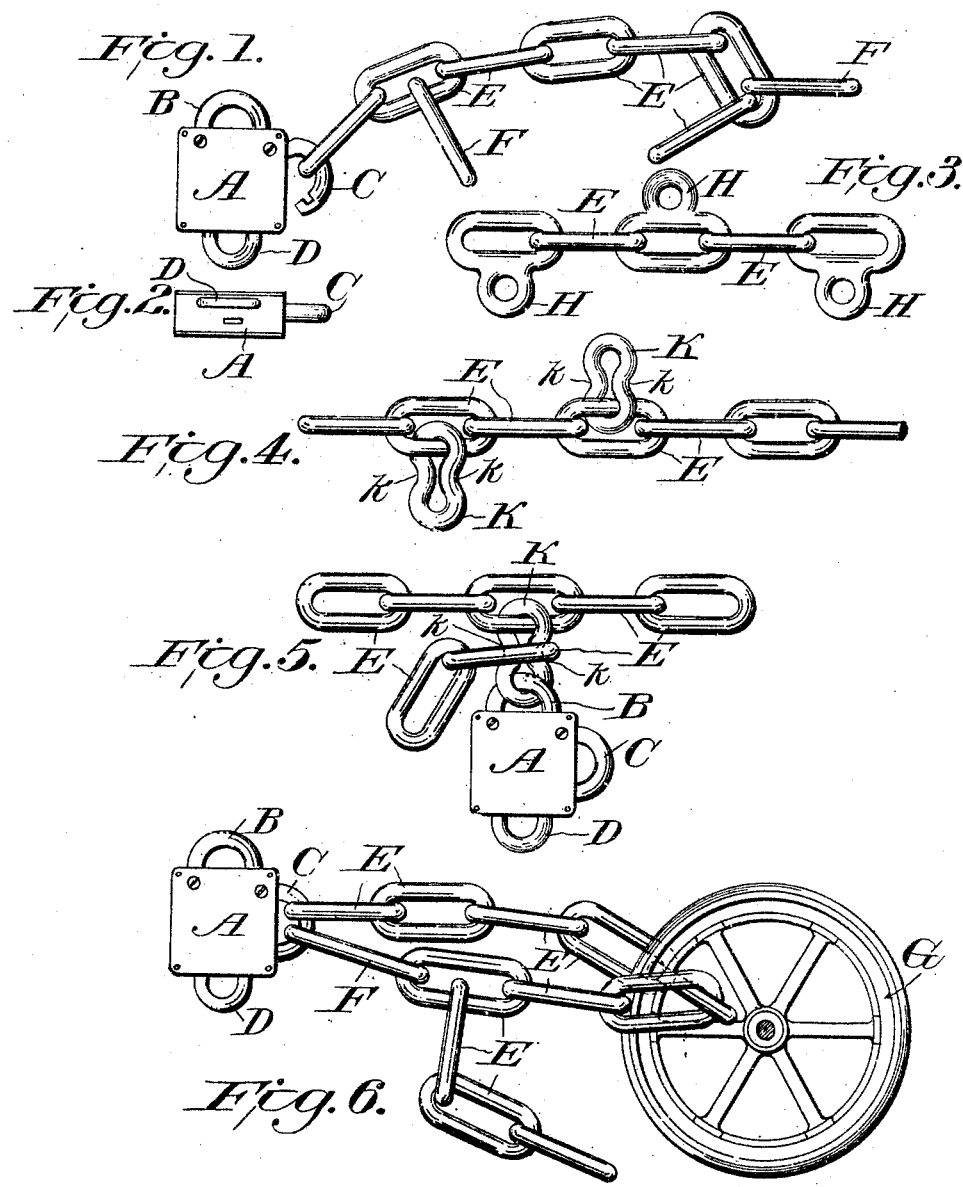

FREDERICK SEEBER, OF NEW YORK, N. Y.

WHEEL-LOCKING DEVICE.

1,098,982.  Specification of Letters Patent.  Patented June 2, 1914.

Application filed October 20, 1913.  Serial No. 796,253.

*To all whom it may concern:*

Be it known that I, FREDERICK SEEBER, a citizen of the United States, residing at New York, in the county and State of New York, have invented certain new and useful Improvements in Wheel-Locking Devices, of which the following is a full, clear, and exact specification.

This invention relates to wheel locking devices especially adapted for locking automobile, bicycle and other vehicle wheels to any suitable portion of the body of the vehicle in order to prevent the vehicle from being driven or ridden away by unauthorized persons. The locking device of the present invention belongs to that type having a chain for engagement with the wheel and some fixture, such as a part of the vehicle body, and a lock for securing the chain at the proper tension.

One object of the invention is to obviate the strain upon the lock mechanism which results when one end of the chain is attached to a shackle and the other end to a rigid loop at the opposite side of the lock, or when the two ends of the chain are attached to separate shackles on the same lock.

Another object is to facilitate the adjustment of the chain to the proper tension without depending entirely upon the regular links.

Further objects will become apparent as the description proceeds.

The invention will first be hereinafter described in connection with the accompanying drawings, which constitute a part of this specification, and then more specifically set forth in the claims at the end of the description.

In the accompanying drawings, wherein similar reference characters are used to designate corresponding parts throughout the several views:—

Figure 1 is a side view of the lock and chain constituting one form of my invention, one of the shackles of the lock being shown in open position and one end of the chain engaged therewith. Fig. 2 is a bottom end view of the lock. Fig. 3 is a side view of a portion of a modified form of chain having double loop integral links. Fig. 4 is a side view of a portion of chain having another form of branch link. Fig. 5 is a similar view of the end portions of a chain such as is illustrated in Fig. 4, showing how said ends are fastened together by the branch link and the lock, and Fig. 6 is a side view of the locking device such as is illustrated in Fig. 1, applied to a vehicle wheel.

Referring more particularly to the drawings, the locking device consists essentially of a chain having branch links attached thereto at intervals, and a lock having a plurality of shackles, any one of which may be used alone for securing both ends of the chain after it has been passed through a wheel for locking the same.

The lock A, as illustrated, has two shackles B and C, one arranged at the top and the other at the side thereof. The lock may also be provided with a rigid non-movable loop D at the bottom for carrying the lock on a chain or ring when not in use. The two shackles are provided for the sake of convenience, it being conceivable that in some instances or places it will be more convenient to utilize one of said shackles than the other, especially in view of the fact that the loop D is arranged opposite one of the shackles.

The chain illustrated in Figs. 1 and 6 consists of a plurality of links E of ordinary form, and one or more branch links F connected at suitable intervals and on opposite sides of the chain, as clearly shown in Fig. 1. By means of this arrangement of the links on both sides of the chain, there will always be one handy for connection to the shackle of the lock in whatever position said chain happens to lie after it is passed through the wheel to be locked. In Fig. 6 the end link E and branch link F are engaged with the side shackle of the lock, the chain having been previously passed through the wheel G.

Instead of the separate branch links F, certain of the links of the chain may be formed, as illustrated in Fig. 3, with integral branch loops or eyes H, the result being the same.

As illustrated in Figs. 4 and 5, the branch links K may be separate but have their sides crimped or bent inward, as at *k*, to provide seats for the end link of the chain which may be slipped over said branch link, as shown in Fig. 5, before the lock is attached, said lock in this instance being engaged simply with the end of the branch link, it being unnecessary to have it also engage the end link of the chain, as will be readily understood.

Having thus described my invention, what I claim as new and desire to secure by Letters Patent of the United States is:—

1. In a locking device of the character described, the combination with a lock having a shackle, of a chain having branch links arranged alternately on opposite sides thereof for the purpose specified.

2. In a locking device of the character described, the combination with a lock, of a chain having certain of its links formed with integral branch loops arranged midway of the length of said links for the purpose specified.

3. In a locking device of the character described, the combination with a lock, of a chain having certain of its links formed with integral branch loops, the diameter of the openings of which are substantially equal to the smaller dimension of the openings in the links proper, for the purpose specified.

In testimony whereof I have signed my name to this specification in the presence of two attesting witnesses.

FREDERICK SEEBER.

Witnesses:
C. F. WHITESIDE,
S. JACKSON.